(12) United States Patent
Chung

(10) Patent No.: US 12,723,174 B2
(45) Date of Patent: Sep. 1, 2026

(54) COLORED ANTI-FOULING ANTI-CORROSION SURFACE COATING, USES THEREOF, COLORED ANTI-FOULING ANTI-CORROSION SURFACE LAYER, AND COLORED ANTI-FOULING ANTI-CORROSION METAL

(71) Applicant: RAYOUNG CHEMTECH INC., New Taipei City (TW)

(72) Inventor: Chih Han Chung, New Taipei City (TW)

(73) Assignee: RAYOUNG CHEMTECH INC., New Taipei City (TW)

( * ) Notice: Subject to any disclaimer, the term of this patent is extended or adjusted under 35 U.S.C. 154(b) by 626 days.

(21) Appl. No.: 18/203,827

(22) Filed: May 31, 2023

(65) Prior Publication Data

US 2023/0383141 A1 Nov. 30, 2023

Related U.S. Application Data

(60) Provisional application No. 63/347,178, filed on May 31, 2022.

(51) Int. Cl.

| | |
|---|---|
| ***C08L 83/16*** | (2006.01) |
| ***B05D 5/02*** | (2006.01) |
| ***B05D 7/14*** | (2006.01) |
| ***C09D 5/08*** | (2006.01) |
| ***C09D 5/16*** | (2006.01) |
| ***C09D 7/20*** | (2018.01) |
| ***C09D 7/41*** | (2018.01) |

(Continued)

(52) U.S. Cl.

CPC ............. *C09D 183/16* (2013.01); *B05D 5/02* (2013.01); *B05D 7/14* (2013.01); *C09D 5/082* (2013.01); *C09D 5/086* (2013.01); *C09D 5/1637* (2013.01); *C09D 5/1687* (2013.01); *C09D 7/20* (2018.01); *C09D 7/41* (2018.01); *C09D 7/63* (2018.01); *C09D 127/16* (2013.01); *C09D 167/00* (2013.01); *B05D 2202/35* (2013.01); *C08L 83/16* (2013.01); *C09D 7/62* (2018.01)

(58) Field of Classification Search

None

See application file for complete search history.

(56) References Cited

U.S. PATENT DOCUMENTS 5,296,511 A * 3/1994 Ohsawa ............... C09D 183/16 522/74

FOREIGN PATENT DOCUMENTS

| | | | | |
|---|---|---|---|---|
| JP | 2014065814 A | * 4/2014 | ............... | C09D 7/40 |
| KR | 20190142533 A | * 12/2019 | ............... | C09D 7/20 |

* cited by examiner

*Primary Examiner* — Richard A. Huhn

(74) *Attorney, Agent, or Firm* — Birch, Stewart, Kolasch & Birch, LLP

(57) ABSTRACT

Disclosed are a colored anti-fouling anti-corrosion surface coating, uses thereof, a colored anti-fouling anti-corrosion surface layer, and a colored anti-fouling anti-corrosion metal. The colored anti-fouling anti-corrosion surface coating includes a fluorine-modified polysilazane and a surface-modified pigment; where the fluorine-modified polysilazane accounts for approximately 5-60% in weight percentage (wt %, %). The coating of the present disclosure can be directly reacted and adhered onto a steel material or a non-ferrous metal material without a primer, and can endow a substance to be coated a suitable color and gloss, and can be directly applied to the field which has been completed in the post-market without any heating or processing within a plant.

17 Claims, 2 Drawing Sheets

(51) Int. Cl.

| | |
|---|---|
| ***C09D 7/62*** | (2018.01) |
| ***C09D 7/63*** | (2018.01) |
| ***C09D 127/16*** | (2006.01) |
| ***C09D 167/00*** | (2006.01) |
| ***C09D 183/16*** | (2006.01) |

COLORED ANTI-FOULING ANTI-CORROSION SURFACE COATING, USES THEREOF, COLORED ANTI-FOULING ANTI-CORROSION SURFACE LAYER, AND COLORED ANTI-FOULING ANTI-CORROSION METAL

CROSS REFERENCE TO RELATED APPLICATIONS

This non-provisional application claims the benefit under 35 U.S.C. § 119 (e) to U.S. Provisional Application No. 63/347,178, filed on May 31, 2022, all of which are hereby expressly incorporated by reference into the present application.

FIELD OF TECHNOLOGY

The present invention relates to a coating and, in particular, to, a colored anti-fouling anti-corrosion surface coating, uses thereof, a colored anti-fouling anti-corrosion surface layer, and a colored anti-fouling anti-corrosion metal.

BACKGROUND

Currently, most of the existing steel materials are coated with at least two layers of coatings, namely, a layer of primer and a layer of colored scroll-steel top coating. The first layer of primer is applied to enhance the adhesion between the colored scroll-steel top coating and the base material surface of the material. Common primer material includes polyurethane resins, epoxy resins or polyester resins; and the film thickness is about 5-20 μm. The secondary layer of colored strip-steel top coating is applied to protect the steel material from being corroded and endow a color. Generally, the top coating material includes fluorocarbon coatings, silicon modified polyester (SMP) resins, polyester (PE) resins, and the like; and the film thickness is about 25-30 μm. Fluorocarbon coatings further contain polyvinylidene difluoride (PVDF), fluoroethylene-vinyl ether (FEVE) copolymers, polytetrafluoroethylene (PTFE), and the like.

PVDF fluorocarbon coatings are set as an example; PVDF can be used for making high-end paints for metals, which are in use on many prominent buildings around the world, such as the Petronas Towers in Malaysia and Taipei 101 in Taiwan. This kind of paint is used on commercial and residential metal roofing as well. When used for general and conventional building facades, PVDF fluoropolymer coating, as the weather-resistant material, has the advantages of durability and erosion resistance, and will not fade or deteriorate regardless of the sunlight or rain. In addition, PVDF fluoropolymer coating has good resistance to salt fog, and quite strong erosion resistance.

However, the disadvantage of the prior art is as follows: PVDF fluoropolymer coating needs to be heated at high temperature (240-300° C.), so it can be only processed in a plant and cannot be used outdoors directly. Moreover, because of the high processing temperature, the PVDF fluoropolymer coating cannot be applied on a titanium sheet. In addition to inconvenience in processing, its processing temperature can also cause problems such as discoloration or deformation of a titanium sheet. Therefore, the prior art is not suitable for the direct application in the field.

Moreover, PVDF has low hardness, only about HB hardness. The water contact angle (hydrophobic angle) and the sliding angle of PVDF is about 80-90 degrees and about 40-50 degrees, respectively, and hence its stain-repellency of PVDF is also relatively low. Therefore, the anti-graffiti criteria cannot be met, or it is difficult to clean. Cleaning staff will spend a lot of time to achieve required cleaning effect, and they might use strong acids or strong alkalis to clean in pursuit of efficiency, which will shorten the service life of a building, or waste energy and resources.

Furthermore, when a subject is directly nailed on the PVDF coating on a galvanized steel sheet, the damaged area of the coating will rust.

Therefore, the major drive for the present invention is to provide a colored anti-fouling anti-corrosion hydrophobic coating with strong adhesion force to polar and low polar materials. The coating of the present invention can be directly reacted and adhered on a steel material or non-ferrous metal material without a primer, and can endow a substance to be coated a suitable color and gloss. Moreover, the coating of the present invention can be directly applied to the field which has been completed in the post-market without any heating or processing within a plant.

More preferably, another drive for the present invention is to provide a surface coating; the surface coating can be not only directly applied on a material to be coated, but also applied on a PVDF fluoropolymer coating based on conventional methods, thereby retaining the original gloss, preventing rusting, increasing the surface hardness and avoiding chalking of the priming coat. Meanwhile, the challenge in processing the surface coating is reduced such that problems like discoloration and deformation can be avoided; and additionally, the surface coating is easy to wash with water and clean.

SUMMARY

To solve the above and other problems, the objective of the present invention is to provide a colored anti-fouling anti-corrosion surface coating, uses thereof, a colored anti-fouling anti-corrosion surface layer, and a colored anti-fouling anti-corrosion metal, so as to improve the prior art.

Another objective of the present invention is to provide a colored anti-fouling anti-corrosion surface coating which has strong adhesion force to polar and low polar materials.

A further objective of the present invention is to provide a colored anti-fouling anti-corrosion surface coating which may be directly reacted and adhered on a steel material or non-ferrous metal material without a primer, and may endow a substance to be coated a suitable color and gloss.

A further objective of the present invention is to provide a colored anti-fouling anti-corrosion surface coating which may be directly applied to the field which has been completed in the post-market without any heating or processing within a plant.

A further objective of the present invention is to provide a colored anti-fouling anti-corrosion surface coating which may be not only applied on a material to be coated directly, but also applied on a protective coating for metals (e.g., a PVDF fluoropolymer coating) based on conventional methods.

A further objective of the present invention is to provide a colored anti-fouling anti-corrosion surface coating which may retain the original gloss of a substance to be coated (a metal), prevent rusting, increase the surface hardness and avoid chalking of the priming coat, and reduce processing difficulty, avoid problems like discoloration and deformation, and is easy to wash with water and clean.

A further objective of the present invention is to provide uses of a colored anti-fouling anti-corrosion surface coating, a colored anti-fouling anti-corrosion surface layer, and a colored anti-fouling anti-corrosion metal, thus achieving the objectives of the present invention.

To achieve the foregoing and other objective of the present invention, the present invention provides a colored anti-fouling anti-corrosion surface coating in examples, including approximately 5-60% of a fluorine-modified polysilazane and approximately 0.05-6% of a surface-modified pigment in weight percentage (wt %, %).

Alternatively, the fluorine-modified polysilazane accounts for approximately 5-60% and the surface-modified pigment accounts for approximately 0.05-25%, to achieve a wider range of applications.

Preferably, the fluorine-modified polysilazane is formed by copolymerizing a fluoride, a siloxane, and a silazane. Preferably, the fluoride accounts for approximately 10-30%, the siloxane accounts for approximately 20-30%, and the silazane accounts for approximately 40-70%.

Preferably, the fluorine-modified polysilazane includes but is not limited to: poly(perfluorodecyl methylsiloxane), poly(nonafluorohexyl siloxane), poly(methyl trifluoropropyl siloxane), and polydimethylsiloxane.

Moreover, preferably, the fluorine-modified polysilazane includes but is not limited to: hexafluoropropylene oxide, perfluoropolyether sulfonic acid, trifluoromethyl trifluorovinyl ether, poly(tetrafluoroethylene-co-trifluoromethyl trifluorovinyl ether), perfluoro(propylvinyl ether), perfluoro (sulfonylvinyl ether), hexafluoroisobutylene, pentafluoroethyl trifluorovinyl ether, perfluoro-3,5-dioxahexyl vinyl ether, and hexafluoropropylene oxide trimer vinyl ether.

Preferably, the surface-modified pigment includes a surface modifier and a pigment. Preferably, the surface modifier includes but is not limited to silane, acrylamide silane, benzyl silane, ureidosilane, amidosilane, epoxy silane, and amino silane. Preferably, the pigment includes but is not limited to: an organic or inorganic pigment with a color number of PY194, PY150, PY154, PY83, PO36, PR254, PR179, PR122, PV19, PV23, PB15-1, PB15-3, PB15-4, PG7, PG36, PW6, PBk7, PBk28, PBk33, PB28, PB28, PBr24, PBr29, PY42, PY184, PY53, PY119, PY164, PG17 and PR101.

Alternatively, the pigment contains analogous colors of Chrome Antimony Titanium Buff Rutile (PBR24-S), Bismuth Vanadate (PY184-S), Cobalt Blue (PBI28-S), Red Iron Oxide (PR101-S), and Copper Chromite Black Spinel (PBK28-S).

Preferably, the present invention further contains approximately 90-95% of a solvent. Alternatively, the solvent accounts for approximately 35-85%, to achieve a wider range of applications.

To achieve the foregoing and other objectives of the present invention, the present invention further provides use of a colored anti-fouling anti-corrosion surface coating as a top coating to be applied on a corrosion-prone metal sheet which is coated with a protective coating for metals in the examples. Preferably, a metal of the metal sheet includes but is not limited to iron, steel, galvanized steel, nickel-plated iron, a magnesium-aluminum-zinc alloy, aluminum or an aluminum alloy.

To achieve the foregoing and other objectives of the present invention, the present invention further provides use of a colored anti-fouling anti-corrosion surface coating as a top coating to be directly applied on a metal sheet composed of a metal that is not susceptible to corrosion in the examples. Preferably, a metal of the metal sheet includes but is not limited to titanium or a titanium alloy.

To achieve the foregoing and other objectives of the present invention, the present invention further provides a colored anti-fouling anti-corrosion surface layer; the foregoing colored anti-fouling anti-corrosion surface coating is applied and then hardened into a layer by moisture at room temperature or by heat curing in the examples.

To achieve the foregoing and other objectives of the present invention, the present invention further provides a colored anti-fouling anti-corrosion metal, including binding the foregoing colored anti-fouling anti-corrosion surface coating onto a surface of a metal that is not susceptible to corrosion in the examples, where the metal includes but is not limited to a titanium alloy.

To achieve the foregoing and other objectives of the present invention, the present invention further provides a colored anti-fouling anti-corrosion metal, including binding the foregoing colored anti-fouling anti-corrosion surface coating onto a surface of a corrosion-prone metal with a protective coating for metals, where the protective coating for metals includes but is not limited to: a fluoropolymer coating, a silicone modified polyester (SMP) coating, a silicone modified PVDF (SMPF) coating or a polyester (PE) coating, and where the metal includes but is not limited to an iron sheet, a steel sheet, a galvanized steel sheet, a nickel-plated iron sheet, a magnesium-aluminum-zinc alloy or an aluminum alloy.

DESCRIPTION OF THE EMBODIMENTS

Figure 1:
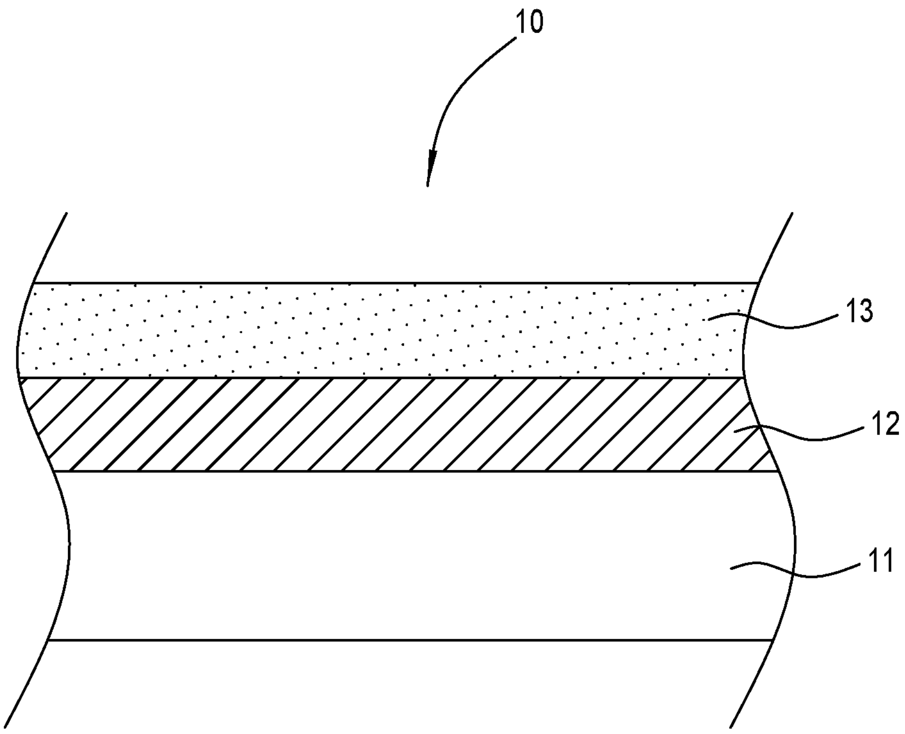
FIG. 1 shows that a coating in examples of the present invention is bound onto a surface of a metal with a protective coating for metals.

The present invention discloses a colored anti-fouling anti-corrosion surface coating in the examples, including approximately 5-60% of a fluorine-modified polysilazane and approximately 0.05-6% of a surface-modified pigment in weight percentage (wt %, %). Alternatively, the fluorine-modified polysilazane accounts for approximately 5-60% and the surface-modified pigment accounts for approximately 0.05-25%, to achieve a wider range of applications. Preferably, the fluorine-modified polysilazane is formed by copolymerizing a fluoride, a siloxane, and a silazane. Preferably, in the fluorine-modified polysilazane, the fluoride accounts for approximately 10-30%, the siloxane accounts for approximately 20-30%, and the silazane accounts for approximately 40-70%.

Preferably, the fluorine-modified polysilazane includes but is not limited to: poly(perfluorodecyl methylsiloxane), poly(nonafluorohexyl siloxane), poly(methyl trifluoropropyl siloxane), and polydimethylsiloxane. Moreover, preferably, the fluorine-modified polysilazane includes but is not limited to: hexafluoropropylene oxide, perfluoropolyether sulfonic acid, trifluoromethyl trifluorovinyl ether, poly(tetrafluoroethylene-co-trifluoromethyl trifluorovinyl ether), perfluoro(propylvinyl ether), perfluoro(sulfonylvinyl ether), hexafluoroisobutylene, pentafluoroethyl trifluorovinyl ether, perfluoro-3,5-dioxahexyl vinyl ether, and hexafluoropropylene oxide trimer vinyl ether.

The fluoridation of polysilazane in this example may be referring to the previous case of the inventor.

Preferably, the surface-modified pigment includes a surface modifier and a pigment.

Preferably, the surface modifier includes but is not limited to silane, acrylamide silane, benzyl silane, ureidosilane, amidosilane, epoxy silane, and amino silane. Preferably, the pigment includes but is not limited to: an organic or inorganic pigment with a color number of PY194, PY150, PY154, PY83, PO36, PR254, PR179, PR122, PV19, PV23, PB15-1, PB15-3, PB15-4, PG7, PG36, PW6, PBk7, PBk28, PBk33, PB28, PB28, PBr24, PBr29, PY42, PY184, PY53, PY119, PY164, PG17 and PR101.

Surface treatment of the pigment is illustrated below, 100 g of a pigment Chrome Antimony Titanium Buff Rutile (PBR24) is taken and added to 11 solvent (40% n-octane, 40% toluene and 20% methanol), stirred evenly and heated up to 60° C. for heat preservation. Silane, e.g., Silquest-A-178 is dropped to the above solution with a pump at a constant weight and a rate of 3 cc/min, and subject to heat preservation at 60° C. for 30 min. Deionized water is dropped into the above solution with a pump at a constant weight and a rate of 1 cc/min, and subject to heat preservation at 70° C. for 180 min. Finally, solid pigment is filtered out in a way of air exhaust, and placed into a vacuum oven for heat preservation at 110° C. for 8 h, and solvent is removed, to obtain a surface-modified pigment yellow PBR24-S.

For instance, the pigment includes the following types and may be named below after being modified:

PBR24-S: Chrome Antimony Titanium Buff Rutile; PY184-S: Bismuth Vanadate; PBI28-S: Cobalt Blue; PR101-S: Red Iron Oxide; and PBK28-S: Copper chromite black spinel.

Silane may be selected from the followings of brand Momentive: acrylamido silane: Silquest A-178; benzyl silane: Silquest A-1129; ureido silane: Silquest A-1524 and Silquest A-1160; amido silane: Silquest A-1387 and Silquest Y-19139; epoxy silane: Silquest Y-19276; amino silane: Silquest Y-15998 and Silquest Y-19278.

Of course, brands TORAY and XIAMETER may be available.

The coating in this example is named HyperDurays RG, as one of the HyperDurays coatings. Embodiments are as follows: 0.05-6% of the foregoing surface-modified pigment, 5-60% of the fluorine-modified polysilazane and 30-90% of the solvent were taken and mixed well in a three-necked bottle, then stirred continuously and vacuumized, and maintained at a constant temperature of 50° C. for 24 h, to obtain the HyperDurays RG coating in this example.

Besides the foregoing colored anti-fouling anti-corrosion surface coating, the present invention further discloses use thereof as a top coating to be applied on a metal sheet which is coated with a protective coating for metals (at this time, metal of the metal sheet includes but is not limited to iron, steel, galvanized steel, nickel-plated iron, a magnesium-aluminum-zinc alloy, aluminum or an aluminum alloy), or use thereof as a top coating to be directly applied on a metal sheet (at this time, metal of the metal sheet includes but is not limited to titanium or a titanium alloy), as well as two colored anti-fouling anti-corrosion metals thereof (inclusive or exclusive of a protective coating for metals). Of course, the foregoing colored anti-fouling anti-corrosion surface coating is applied and then hardened into a layer by moisture at room temperature or by heat curing, namely, the colored anti-fouling anti-corrosion surface layer, which falls within the scope of the present disclosure as well.

Figure 2:
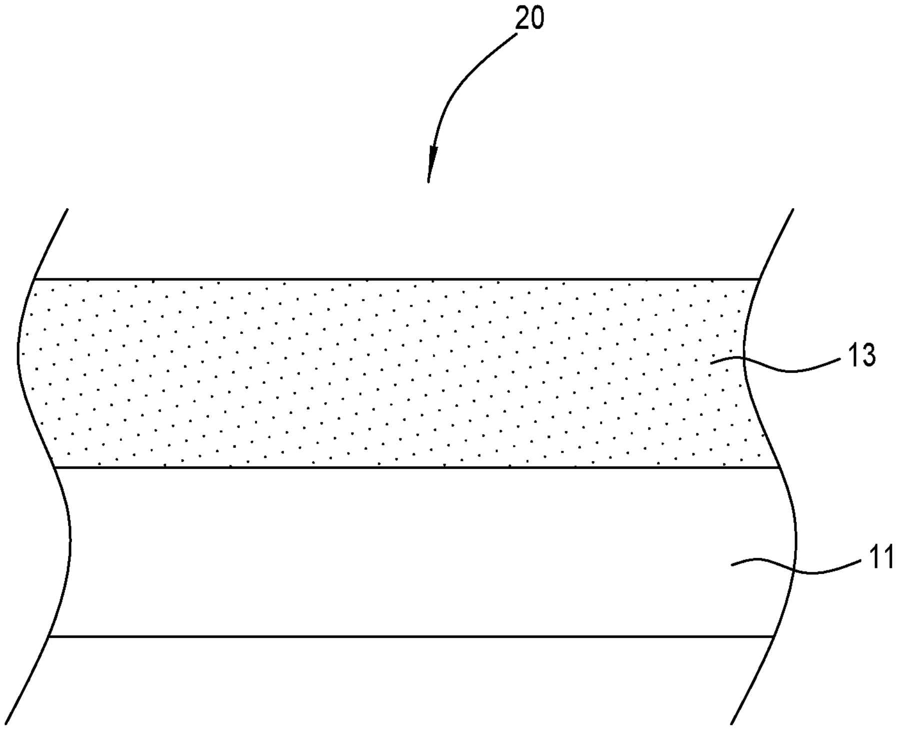
FIG. 2 shows that a coating in examples of the present invention is bound onto a surface of a metal without a protective coating for metals.

FIG. 1 shows a colored anti-fouling anti-corrosion metal with a protective coating for metals in the examples of the present invention. FIG. 2 shows a colored anti-fouling anti-corrosion metal without a protective coating for metals in the examples of the present invention.

As shown in FIG. 1, the colored anti-fouling anti-corrosion surface coating is applied onto a surface of a metal 11 with a protective coating for metals 12, and then hardened into a layer by moisture at room temperature or by heat curing, namely, the colored anti-fouling anti-corrosion surface layer 13. In other words, the colored anti-fouling anti-corrosion metal 10 contains a metal layer 11, a protective coating for metals 12, and a colored anti-fouling anti-corrosion surface layer 13 which are overlaid layer by layer. Preferably, the metal of the metal layer 11 includes but is not limited to iron, steel, galvanized steel, nickel-plated iron, a magnesium-aluminum-zinc alloy, aluminum or an aluminum alloy. Preferably, the protective coating for metals 12 includes but is not limited to: a fluoropolymer coating, a silicone modified polyester (SMP) coating, a silicone modified PVDF (SMPF) coating or a polyester (PE) coating, and where the metal includes but is not limited to an iron sheet, a steel sheet, a galvanized steel sheet, a nickel-plated iron sheet, a magnesium-aluminum-zinc alloy or an aluminum alloy.

As shown in FIG. 2, the colored anti-fouling anti-corrosion surface coating is directly applied onto a surface of a metal 11, and then hardened into a layer by moisture at room temperature or by heat curing, namely, the colored anti-fouling anti-corrosion surface layer 13. In other words, at this time, the colored anti-fouling anti-corrosion metal 20 contains a metal layer 11, and a colored anti-fouling anti-corrosion surface layer 13 which are overlaid layer by layer. Preferably, the metal of the metal layer 11 includes but is not limited to titanium or a titanium alloy.

For the convenience of illustration, the colored anti-fouling anti-corrosion surface coating is tested and compared particularly below.

The following examples are mainly focused on the tests below: one, the coating is bound onto a surface of a metal with a protective coating for metals (as shown in FIG. 1); two, the coating is bound onto a surface of a metal without a protective coating for metals (as shown in FIG. 2).

The key point of the test one is as follows: a subject is nailed on the PVDF coating in the prior art on a steel sheet, leading to rusting; therefore, the following example is to test whether the coating of the present invention may reduce rusting effectively. The key point of the test two is as follows: the PVDF coating in the prior art is directly applied on a titanium sheet to cause the loss of metallic gloss, and the processing temperature will lead to the discoloration and deformation of the titanium sheet; therefore, the following example is to test whether the coating of the present invention may achieve the effect without high temperature.

Test One

Comparative Example 1

Gamet Primer W (Toa Resin Co. Ltd.) and Duranar fluoropolymer coating (PPG Automotive Refinish) were taken and applied on a galvanized steel sheet (Yieh Phui Z27) as a priming coat and a top coat, respectively, where the dry film thickness of the priming coat and the top coat was 7 μm and 25 μm, respectively, and a finished sheet was obtained via coat priming at a heating temperature of 240° C. for 10 min and top coating at a heating temperature of 250° C. for 15 min. After being fastened on a wooden board with screws, the finished sheet was subjected to tests for determination of the water contact angle, the sliding angle and the salt spray resistance. According to the test results, the water contact angle was 82±5 degrees, the sliding angle was 53±5 degrees, and the salt spray resistance test resulted in rusting around the screws.

Comparative Example 2

Gamet Primer W2 (Toa Resin Co. Ltd.) and GAMET #1000 fluoropolymer coating (Toa Resin Co. Ltd.) were taken and applied on a stainless steel sheet (2B cold-rolled, Walsin Lihwa Corporation) as a priming coat and a top coat respectively, where the dry film thickness of the priming coat and the top coat was 5 μm and 20 μm, respectively, and a finished sheet was obtained via coat priming at a heating temperature of 240° C. for 10 min and top coating at a heating temperature of 240° C. for 10 min. After being fastened on a wooden board with screws, the finished sheet was subjected to tests for determination of the water contact angle, the sliding angle and the salt spray resistance. According to the test results, the water contact angle was 85±5 degrees, the sliding angle was 55±5 degrees, and the salt spray resistance test resulted in not obviously rusting around the screws.

Example 1

A galvanized steel sheet (Yieh Phui Z27) was taken and coated with HyperDurays RG-PBR24 (5% surface-modified pigment PBR24-S, 50% fluorine-modified polysilazane and 45% propylene glycol methyl ether acetate (PMA) solvent) in this example. The dry film thickness was 15 μm after the completion of hardening by moisture at room temperature, 1-hour surface drying and 4-hour hardening. Afterwards, the finished sheet was fastened on a wooden board with screws. Test items: water contact angle, sliding angle, salt spray resistance, QUV weathering testing (ultraviolet accelerating aging), and bending (0T "T" Bend). According to the test results, the water contact angle was 103±5 degrees, the sliding angle was 12±3 degrees, and the salt spray resistance test resulted in no rusting; QUV: 200 hours, less than 108 degrees; 400 hours, less than 106 degrees; and 2000 hours, less than 103 degrees.

Example 2

A galvanized steel sheet (2B cold-rolled, Walsin Lihwa Corporation) was taken and coated with HyperDurays RG-PBI28 (0.1% surface-modified pigment PBI28-S, 5% fluorine-modified polysilazane and 94.9% PMA solvent) of this example. The dry film thickness was 5 μm after the completion of hardening by moisture at room temperature, 1-hour surface drying and 4-hour hardening. Afterwards, the finished sheet was fastened on a wooden board with screws. Test items: water contact angle, sliding angle, salt spray resistance, QUV weathering testing, and 0T T-Bend. According to the test results, the water contact angle was 105±5 degrees, the sliding angle was 10±3 degrees, and the salt spray resistance test resulted in no rusting; QUV: 200 hours, less than 110 degrees; 400 hours, less than 109 degrees, and 2000 hours, less than 105 degrees.

Test Two

Comparative Example 3

20% of an easy-to-clean resin (Merck 1500RC) was taken and mixed with 79.5% of a PMA solvent and 0.5% of PR101, and prepared into a red coating, then the red coating was applied on a surface of a titanium sheet (TC4, Heqiang Titanium Industry). The dry film thickness was 15 μm after the completion of hardening by moisture at room temperature, 1-hour surface drying and 4-hour hardening. Tests were conducted for determination of the water contact angle, the sliding angle, QUV weathering testing (ultraviolet accelerating aging), and bending (0T "T" Bend). According to the test results, the water contact angle was 100±5 degrees, the sliding angle was 55±5 degrees, and the coat fractured in a 0T bend; the contact angles before and after QUV weathering were: 200 hours, less than 100 degrees; 500 hours, less than 90 degrees; and 2000 hours, less than 75 degrees. It needs to indicated that the original titanium sheet may be used in a single layer when coated with a red top coating, and although the contact angle increases after coating, bringing an effect of easy cleaning, the weather resistance is poor due to material mixing only instead of pigment surface modification; moreover, the coat is prone to fracturing when the bending angle of the titanium panel is too large during actual outdoor applications.

Example 3

A titanium sheet (TC4, Heqiang Titanium Industry) was taken and coated with HyperDurays RG-0226 (3% surface-modified pigment PR-101, 35% fluorine-modified polysilazane and 62% PMA solvent) of this example. The dry film thickness was 10 μm after the completion of hardening by moisture at room temperature, 1-hour surface drying and 4-hour hardening. Afterwards, the finished sheet was fastened on a wooden board with screws. Test items: water contact angle, sliding angle, salt spray resistance, QUV weathering testing, and 0T T-Bend. According to the test results, the water contact angle was 104±5 degrees, the sliding angle was 11±3 degrees, and the salt spray resistance test resulted in no rusting; QUV: 200 hours, less than 109 degrees; 400 hours, less than 108 degrees; and 2000 hours, less than 104 degrees.

Example 4

An aluminum sheet (CSAC 5052) was taken and coated with HyperDurays RG-PBI (4% surface-modified pigment PBI28-S, 15% fluorine-modified polysilazane and 81% ISOPAR C&M 50-50% solvent) of this example. The dry film thickness was 5 μm after the completion of hardening by moisture at room temperature, 1-hour surface drying and 4-hour hardening. Afterwards, the finished sheet was fastened on a wooden board with screws. Test items: water contact angle, sliding angle, salt spray resistance, QUV weathering testing, and 0T-1T T-Bend. According to the test results, the water contact angle was 109±5 degrees, the sliding angle was 12±3 degrees, and the salt spray resistance test resulted in no rusting; QUV: 200 hours, less than 109 degrees; 400 hours, less than 108 degrees; and 2000 hours, less than 106 degrees.

As can be seen from the analysis on the results of each Example and Comparative Example, in the test items such as, water contact angle, sliding angle, salt spray resistance test, QUV weathering testing (ultraviolet accelerating aging), and bending (0T "T" Bend), the present invention exceeds standard performances in each example and may achieve the objectives described in the description thereof.

Moreover, the solvent is not limited to PMA or ISOPAR described above.

Finally, overall properties of the HyperDurays RG in the examples are listed as follows:

Film thickness: 3-20 μm;

Bend: 0-1T;

Sliding angle: 10-12 degrees;

Anti-fouling/anti-graffiti property: passed;

Hardness: 1-2H;

Water contact angle: 103-105 degrees.

To sum up, the present invention discloses a colored anti-fouling anti-corrosion hydrophobic coating with strong adhesion force to polar and low polar materials in the examples. The coating of the present invention may be directly reacted and adhered on a steel material or non-ferrous metal material without a primer, and may endow a substance to be coated a suitable color and gloss. Moreover, the coating of the present invention may be directly applied to the field which has been completed in the post-market without any heating or processing within a plant.

Further, the coating of the examples contains a fluorine-modified polysilazane resin, a silicone modified pigment, a filler, an additive and a solvent and thus, has strong adhesion force, anti-fouling/anti-graffiti property, cyclic corrosion resistance, salt-fog resistance, weathering resistance, lyophobicity, oleophobicity, high temperature resistance, thermal shock resistance without a conventional fluorocarbon structure. Meanwhile, the coating of the present invention has the properties such as hardness, toughness and low energy curing, and stain resistance, corrosion prevention, salt-fog resistance and is easy to clean, and even has strong adhesion force to a Sihlcon glue for waterproof, sealing and caulking. Therefore, the coating of the present invention may be hardened by moisture at room temperature and may be directly applied in the field.

Moreover, the coating of the examples may be also processed within a plant and heated to accelerate its curing, thus being applicable to conventional method.

Furthermore, the coating of the examples may be directly applied on a surface of a steel material without a primer and the film thickness is 15-20 μm, and cured with lower energy, which saves energy, reduces carbon footprint, decreases technical drawing frequency and time, and keeps the same weathering resistance and corrosion prevention as those of the original two protective coatings for a steel material. Moreover, the coating of the examples further has more anti-fouling and easy-to-clean properties, thereby greatly reducing the water consumption and amount of a cleaning agent for the subsequent maintenance, being in line with the spirit of ESG.

In other words, the current non-ferrous metal (stainless steel, aluminum alloy, titanium alloy and other materials) on the market is free of rusting itself, but is hardly adhered with a coating generally due to lower surface energy. Therefore, these non-ferrous metals are generally directly cut, processed and machine-shaped as a composite board for use without any treatment (high surface glass materials, doubts about light pollution) or with physical surface matte treatment only. The coating of the examples may be directly adhered onto a non-ferrous metal material with a film thickness of 3-20 μm such that the non-ferrous metal material is endowed with a diversity of colors (semi-transparent or full covering), gloss (high gloss or matte), anti-fouling, lyophobic/oleophobic, easy-to-clean/maintain properties. Moreover, the non-ferrous metal material and a single layer of coating are used herein. The coating is easier to be removed and the non-ferrous metal material is recycled in the following reconstruction or waste recovery of buildings, which conforms to the requirements of cyclic economy and ESG, and greatly reduces carbon footprint.

DESCRIPTION OF REFERENCE NUMERALS

Colored anti-fouling anti-corrosion metal (10, 20)

Metal layer (11)

Protective coating for metals (12)

Colored anti-fouling anti-corrosion surface layer (13)

What is claimed is:

1. A colored anti-fouling anti-corrosion surface coating, comprising approximately 5-60 wt % of a fluorine-modified polysilazane and approximately 0.05-25 wt % of a surface-modified pigment, based on the total weight of the colored anti-fouling anti-corrosion surface coating.

2. The colored anti-fouling anti-corrosion surface coating according to claim 1, wherein the fluorine-modified polysilazane is formed by copolymerizing a fluoride, a siloxane and a silazane.

3. The colored anti-fouling anti-corrosion surface coating according to claim 2, wherein in the fluorine-modified polysilazane, the fluoride accounts for approximately 10-30 wt %, the siloxane accounts for approximately 20-30 wt %, and the silazane accounts for approximately 40-70 wt %, based on the total weight of the fluorine-modified polysilazane.

4. The colored anti-fouling anti-corrosion surface coating according to claim 2, wherein the fluorine-modified polysilazane includes at least one selected from the group consisting of: poly(perfluorodecyl methylsiloxane), poly(nonafluorohexyl siloxane), poly(methyl trifluoropropyl siloxane), polydimethylsiloxane, hexafluoropropylene oxide, perfluoropolyether sulfonic acid, trifluoromethyl trifluorovinyl ether, poly(tetrafluoroethylene-co-trifluoromethyl trifluorovinyl ether), perfluoro (propylvinyl ether), perfluoro (sulfonylvinyl ether), hexafluoroisobutylene, pentafluoroethyl trifluorovinyl ether, perfluoro-3,5-dioxahexyl vinyl ether, and hexafluoropropylene oxide trimer vinyl ether.

5. The colored anti-fouling anti-corrosion surface coating according to claim 2, wherein the siloxane includes at least one selected from the group consisting of polydimethylsiloxane (PDMS), methyl siloxane resin, cyclopentasiloxane, phenyl trimethicone, amodimethicone and cyclomethicone.

6. The colored anti-fouling anti-corrosion surface coating according to claim 1, wherein the surface-modified pigment includes a surface modifier and a pigment.

7. The colored anti-fouling anti-corrosion surface coating according to claim 6, wherein the surface modifier includes at least one selected from the group consisting of: silane, acrylamide silane, benzyl silane, ureidosilane, amidosilane, epoxy silane, and amino silane.

8. The colored anti-fouling anti-corrosion surface coating according to claim 6, wherein the pigment is an organic or inorganic pigment with a color number selected from the group consisting of; PY194, PY150, PY154, PY83, PO36, PR254, PR179, PR122, PV19, PV23, PB15-1, PB15-3, PB15-4, PG7, PG36, PW6, PBk7, PBk28, PBk33, PB28, PBr24, PBr29, PY42, PY184, PY53, PY119, PY164, PG17 and PR101.

9. The colored anti-fouling anti-corrosion surface coating according to claim 1, further comprising approximately 35-85 wt % of a solvent, based on the total weight of the fluorine-modified polysilazane.

10. A method for protecting a substrate, comprising:
applying the colored anti-fouling anti-corrosion surface coating according to claim 1 onto a top surface of the substrate,
wherein the substrate is a corrosion-prone metal sheet which is coated with a protective coating for metals, or a corrosion-resistant metal sheet.

11. The method for protecting a substrate according to claim 10, wherein the corrosion-prone metal sheet includes an iron sheet, a steel sheet, a galvanized steel sheet, a nickel-plated iron sheet, a magnesium-aluminum-zinc alloy sheet, an aluminum sheet, or an aluminum alloy sheet.

12. The method for protecting a substrate according to claim 10, wherein the corrosion-resistant metal sheet includes a titanium sheet or a titanium alloy sheet.

13. A colored anti-fouling anti-corrosion surface layer, comprising a hardened product of the colored anti-fouling anti-corrosion surface coating according to claim 1.

14. A substrate with a protective layer, comprising:
the substrate, being a corrosion-resistant metal that is not susceptible to corrosion, or onto a surface of a corrosion-prone metal with a protective coating for metals; and
the protective layer, disposed on a surface of the substrate, wherein the protective layer is the colored anti-fouling anti-corrosion surface coating according to claim 1.

15. The substrate with the protective layer according to claim 14, wherein the corrosion-resistant metal includes a titanium or a titanium alloy.

16. The substrate with the protective layer according to claim 14, wherein the corrosion-prone metal includes an iron, a steel, a galvanized steel, a nickel-plated iron, a magnesium-aluminum-zinc alloy, an aluminum, or an aluminum alloy.

17. The substrate with the protective layer according to claim 14, wherein the protective coating for metals includes a fluoropolymer coating, a silicone modified polyester (SMP) coating, a silicone modified PVDF (SMPF) coating or a polyester (PE) coating.

* * * * *